United States Patent [19]

Knupfer

[11] Patent Number: 5,486,858
[45] Date of Patent: Jan. 23, 1996

[54] METHOD AND CIRCUIT FOR A NOISE-REDUCED PROCESSING OF PERIODICAL OPTICAL SIGNALS

[75] Inventor: Klaus Knupfer, Essingen, Germany

[73] Assignee: Carl-Zeiss-Stiftung, Heidenheim, Germany

[21] Appl. No.: 963,395

[22] Filed: Oct. 19, 1992

[30] Foreign Application Priority Data

Oct. 19, 1991 [DE] Germany .......................... 41 34 666.1

[51] Int. Cl.⁶ .................................................. H04N 5/335
[52] U.S. Cl. ........................... 348/303; 348/304; 348/297
[58] Field of Search ................................... 348/303, 304, 348/319, 299, 207, 297, 316, 321, 300, 216, 311, 216; H04N 5/335

[56] References Cited

U.S. PATENT DOCUMENTS 4,453,177  6/1984  Berger et al. ........................ 348/316
5,040,071  8/1991  Stevens .................................. 348/321
5,113,263  5/1992  Audaire et al. ........................ 348/303
5,148,013  9/1992  Yamada .................................. 348/316

FOREIGN PATENT DOCUMENTS 3620226  7/1987  Germany ........................ G01S 17/10

Primary Examiner—Joseph Mancuso
Assistant Examiner—Tuan V. Ho
Attorney, Agent, or Firm—Walter Ottesen

[57] ABSTRACT

A method and a circuit are disclosed for a low-noise processing of weak optical signals using normal photodiodes and a CCD-array. A shift register and collecting register effect the synchronous phase-correct accumulation over for example 100 periods and so transmit a signal amplified by this factor to a downstream circuit at a clock frequency reduced by the same factor. The invention is applicable for conducting optoelectronic run-time distance measurements.

14 Claims, 2 Drawing Sheets

METHOD AND CIRCUIT FOR A NOISE-REDUCED PROCESSING OF PERIODICAL OPTICAL SIGNALS

BACKGROUND OF THE INVENTION

At the present state of the art, either photomultipliers or photodiodes are used almost exclusively in different variations for converting weak high-frequency optical signals. Although conventional photodiodes convert the light current practically free of noise into an electrical current, the currents for low light quantities are however so small that the noise of a downstream amplifier is greater by a multiple. Photomultipliers and special avalanche photodiodes have an internal amplification so that even very weak light signals can be detected. Both components have however the disadvantage that they, in turn, add a noise component to the light signal, that they become very expensive and become impractical because of the requirement of a high-voltage source during use and that at least the photomultiplier is too large in a mechanical sense for many applications.

If the high-frequency optical signal is a periodic signal as is mostly the case for distance-measuring devices, then the noise ratio can be improved subsequently by means of an averaging procedure. This averaging takes place in the present state of the art primarily with respect to the analog electronic signal (for example by means of a narrow band filter) but this averaging is also possible in the digital area if the analog electronic received signal is first converted analog to digital.

The last-mentioned situation is disclosed in published German patent application 3,620,226 wherein an avalanche photodiode is used. All of these methods have, however, in common that the signal improvement by means of averaging is only then performed when the weak optical signal has already been charged with additional noise by converters and electronic amplifiers. This additional noise can be attenuated by averaging but cannot be fully eliminated with a reasonable effort. Furthermore, the necessary electronic components (optoelectronic converters, amplifiers and, if necessary, fast analog/digital converters) are expensive components and often not free of problems.

SUMMARY OF THE INVENTION

It is an object of the invention to provide a method and a circuit for processing optical signals having a period. The method and circuit are suitable for very weak signals, ensure a high noise suppression and avoid the disadvantages of the state of the art described above. It is intended that the method and circuit be suitable for application in making optoelectronic run-time distance measurements.

According to a feature of the invention, the processing of optical signals having a period of a first frequency takes place with a conversion of the optical signals into electrical signals and inputting the electrical signals into an analog shift register at a clock frequency which is a multiple of the first frequency. After each lapse of a period of the first frequency, the content of the analog shift register is transmitted in parallel to a collecting register and the above steps are repeated over a specific number of periods of the first frequency for accumulating a time-resolved charge pattern in the collecting register and, after each lapse of the specific number of periods, a sequential output is emitted to a downstream circuit.

According to another feature, the method is varied by combining the operation of the shift register and the collecting register in a circulating register.

According to another feature of the invention, for processing optical signals having a high first frequency (after conversion of the optical signals into analog signals and inputting of the electrical signals into a shift register), the clock frequency is selected as a whole number multiple of the first frequency and the number of the shift-register cells differs by a small number from this whole number multiple. The content of the shift register is transmitted in parallel to a collecting register having the same specific number of collecting-register cells after each lapse of the number of cycles of the clock frequency.

The content of the collecting register is thereafter in each case transmitted into the collecting-register cells shifted by the small number and the content of the last collecting register cell is emitted to an electric circuit for further processing.

According to still another feature of the invention, the number of shift-register cells or collecting-register cells differs by one from the whole number multiple of the first frequency and therefore also from the period of the signals.

According to another feature of the invention, the number of shift-register cells or collecting-register cells is greater than the whole number multiple.

The signal accumulation must not be interrupted for outputting. The outputted signal is free of disturbance effects of the individual shift-register cells and collecting-register cells since transfer and shift via the shifting of the signal period with respect to the shift register are distributed to a plurality of memory cells.

According to another feature of the invention, an accumulation in the order of magnitude of $10^2$ to $10^3$ periods takes place in the collecting register or circulating register. This affords the advantage that, for an input signal greater by an order of magnitude of two or three, the downstream circuit needs only an operating frequency lower by an order of magnitude of two or three than for direct use after the photodiode.

According to another feature of the invention, the various embodiments of the method of the invention can be applied to making optoelectronic run-time distance measurements in lieu of the conventional methods for receiving light and for preamplification.

In another embodiment, the circuit of the invention uses a conventional photodiode for converting the optical signals into electrical signals so that this step, as mentioned above, takes place virtually free of noise with a cost-effective component without special circuit requirements and the use of charge-coupled CCD-arrangements as shift registers and collecting registers or as circulating registers.

The photodiodes, shift register and collecting register or circulating register can be integrated on a chip. This makes the circuit robust, safe against disturbances and cost effective.

The arrangement of the circuit for the method embodiments requires only differences in the details of the configuration of the CCD-array.

The basic concept of the invention is to average and integrate the weak high-frequency signals before an active amplification associated with noise takes place. According to the invention, this averaging is carried out on the electrical charges which occur in a photodiode because of the light signal. In contrast to optical sensors such as videocameras and photosensitive cells where in general only relatively slow changing light signals are received, however, the integration does not take place directly statically for the measurement of high-frequency light signals. In lieu thereof, the charges arising in the photodiodes are shifted at high clock frequency into an analog shift register such as is known from CCD-technology.

An increase of the signal amplitude and a corresponding reduction of the signal frequency at the output takes place with CCD-registers and collecting registers.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
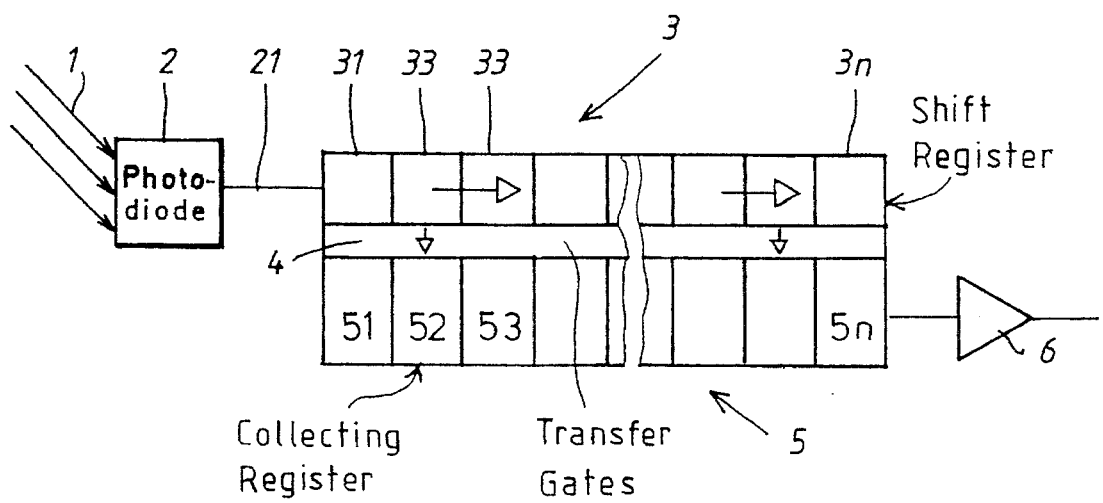
FIG. 1 is a schematic of a first embodiment of the circuit of the invention containing a shift register and a collecting register.

In FIG. 1, an incident periodic light signal having a first frequency is identified by the reference numeral 1. This light signal 1 impinges on a photodiode 2 of conventional configuration which converts the light signal into an electrical signal of low noise, that is, a low charge quantity. This electrical signal is supplied to the first shift-register cell 31 of a shift register 3 having additional shift-register cells (32, 33 to 3n). These cells are analog charge register cells which are configured pursuant to known CCD-technology and are configured as an array to the shift register 3.

The charge in each case is transmitted to a following shift-register cell with a clock frequency in the megahertz range; that is, from cell 31 to cell 32, 3 (n−1) to 3n and the new incoming signal is in each case read into the first shift-register cell 31.

The clock frequency is a whole number multiple of the first frequency and is selected so high that the signal shape and signal duration of the light signal 1 are detected without difficulty. In the case of sinusoidal signals, a factor of 3 is theoretically adequate and four to approximately ten times the clock frequency is advantageous.

Pseudo-stochastic pulse-train signals having a greater clock frequency are advantageous for application in making optoelectronic run-time distance measurements. The number of the shift-register cells (31 to 3n) is equal to this whole number multiple between clock frequency and the first frequency so that the shift register 3 and the collecting register 5 each can receive an entire period of signal 1.

In the cycle of the period of the light signal 1, the charge content of all shift-register cells (31 to 3n) of the shift register 3 is transmitted in parallel via transfer gates 4 into the analog collecting register 5 which has a corresponding collecting-register cell (51 to 5n) for each shift-register cell 31 to 3n). The collecting register 5 is configured in CCD-technology in the same manner as the shift register 3 and is joined with the shift register to a CCD-array on a chip. In this collecting register 5, the charges are added over many periods in the order of magnitude of, for example, $10^2$ to $10^3$ times.

The downstream circuit 6 is indicated in the drawing as an amplifier and a signal is outputted from the collecting register 5 to the circuit 6 which has a charge higher by the factor of the addition periods ($10^2$ to $10^3$) and a clock frequency lower by the factor of $10^2$ to $10^3$. The form of the signal is transmitted unfalsified because of the practically noise-free addition and averaging. The electronic further processing can therefore achieve a high precision at low frequency with non-critical components.

Details of the configuration of the CCD-chips and their circuitry for current supply, supply of clock frequency and the like are available in the context of CCD-technology as is the circuitry of the photodiode 2. The fact that high voltages are not needed is advantageous compared to the use of avalanche photodiodes.

Figure 2:
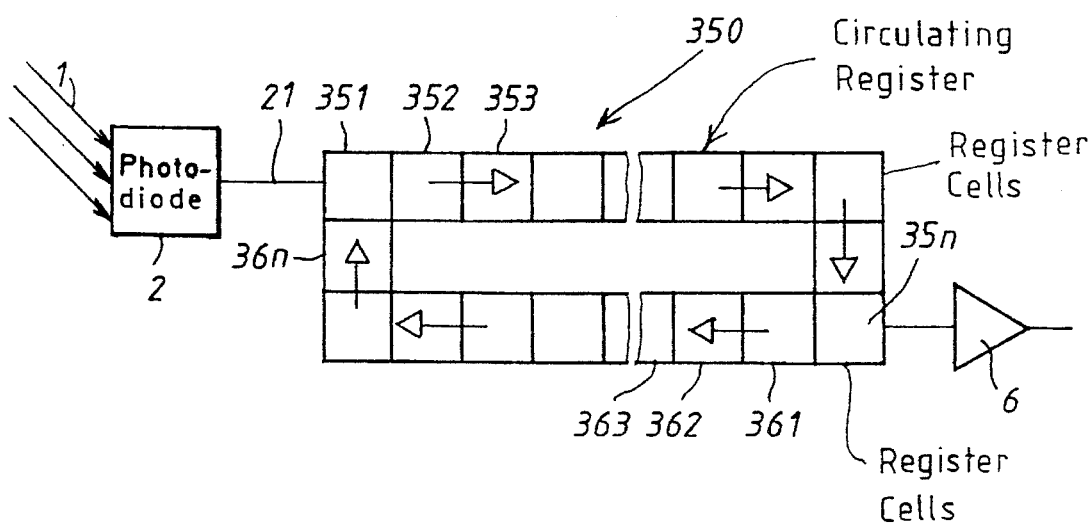
FIG. 2 is a schematic of an embodiment of the circuit of the invention including a circulating register; and, FIG. 3 shows for the circuit of FIG. 1, for the input signal, the trace of the signal applied at the input, the shift register, the collecting register and the output.

FIG. 2 shows an embodiment using the same technology. Here too, the light signal 1 is converted by the photodiode 2 and supplied to a CCD-array which is here configured as a circulating register 350. The circulating register includes register cells (351, 352, 353 to 35n) into which an entire period of light signals 1 is read in sequentially in the same manner as shown for the shift register 3 of FIG. 1. Thereafter, a same number of additional register cells (361, 362, 363 to 36n) is arranged which close a loop at cell 351. The clock frequency of the circulating register 350 is synchronized with the first frequency of the period of the light signal 1. In this way, the stored signal from the register cell 36n and the signal from the photodiode 2 are read in simultaneously into the register cell 351. The signal of photodiode 2 is in the same phase position in the period of the light signal 1. In this way and pursuant to the embodiment of FIG. 1, the phase-correct noise-free charge accumulation is obtained. After a predetermined number of circulations in the circulating register 350, the signal is read out sequentially, from the register cell 35n and applied to the downstream circuit 6.

The number (n) of the register cells (351 to 35n) for the detection of a period of the light signal 1 is determined pursuant to the same criteria as in the embodiment of FIG. 1. The total number of the register cells (351 to 35n) must be a whole number multiple of (n) in order to permit synchronous accumulation. The double number (2n) is shown in the embodiment; however, the simple number (n) is especially suitable for which a shift directly from the memory cell 35 and into the cell 351 takes place.

Figure 3:
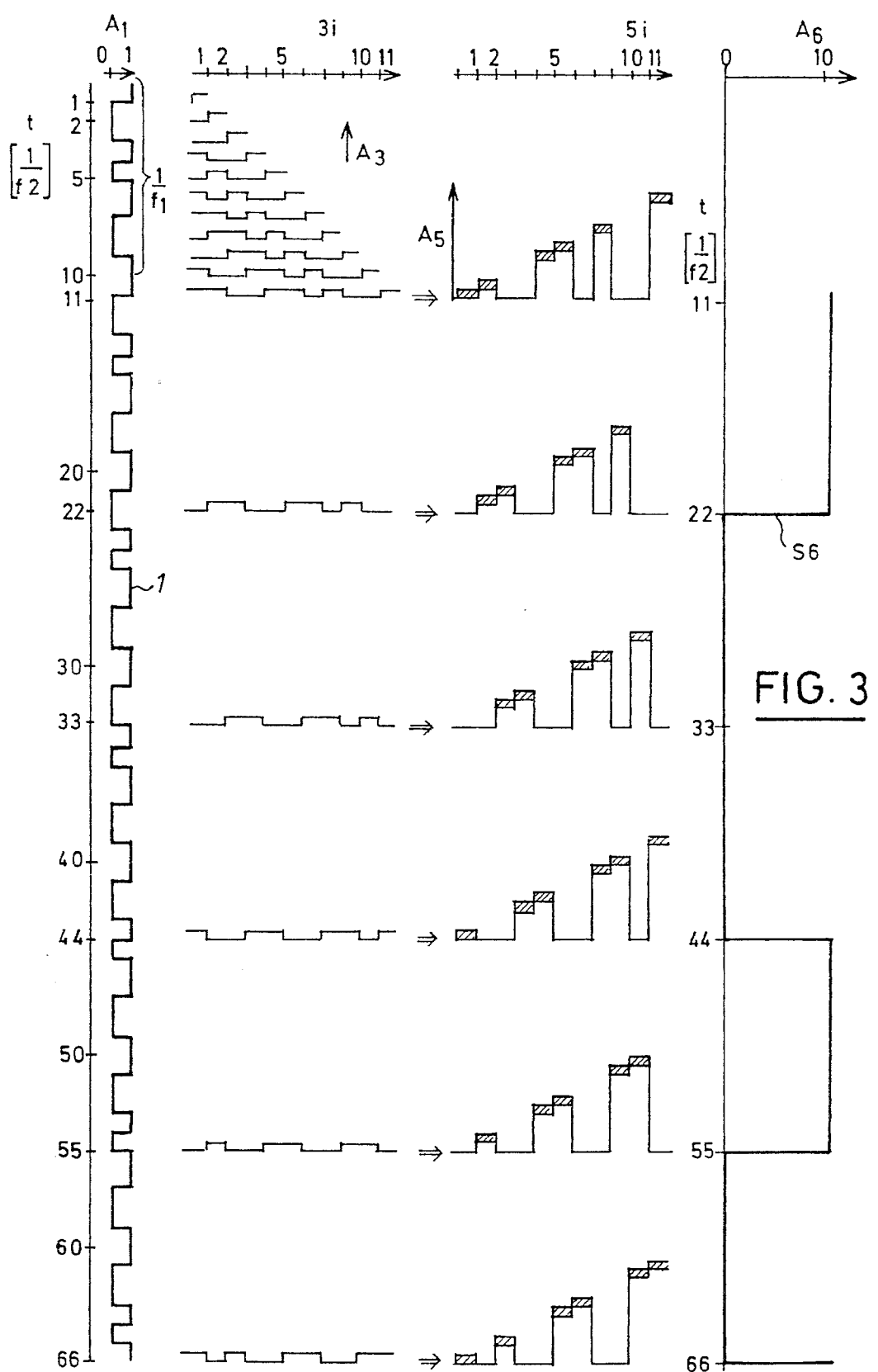

A further advantageous embodiment of the method of the invention increases the number of the shift-register cells 3i and receiving-register cells 5i by one. FIG. 3 shows for the example of a signal 1, the time sequence in the following: shift register 3, collecting register 5 and at the output to the downstream circuit 6.

The signal 1 shown in FIG. 3 is periodic and has a first frequency $f_1$ and is a simplified model of a pseudo-stochastic pulse-train signal. The clock frequency $f_2$ is ten times the first frequency $f_1$ so that the form of the signal 1 is scanned correctly.

Shift register 3 and collecting register 5 have now a number (z) of register cells (3i, 5i) which must be greater by k=1 than the multiple n (z=n+k=n+1).

The parallel transmission of the content of shift register 3 into the collecting register 5 now takes place after z cycles of the clock frequency $f_2$; that is, shifted precisely by one cycle with respect to the period of the signal 1. The content of collecting register 5 is shifted by one collecting-register cell 5i between each two transmissions and the content of the last collecting-register cell (5n+1) is outputted to the evaluation circuit 6.

In FIG. 3, at the left from the top downwardly, the amplitude $A_1$ of the signal 1 is shown over the time (t) in units of inverted clock frequency ($1/f_2$). The period duration amounts to $1/f_1=10 \cdot 1/f_2$.

In each case for the same time (t), the amplitude $A_3$ read into the shift-register cells $3i$ of the shift register 3 is shown for the shift-register cells (31 to 311). After each 11, 22, 33, etcetera cycles of the clock frequency $f_2$, the content of the shift register 3 is transmitted into the collecting register 5. The content of the shift register 3 is moved further along with respect to the previous transmission by one shift-register cell ($3i+1$).

Next to the above, and assigned to the same time (t), the amplitude $A_5$ read into the receiving-register cells $5i$ of the collecting register 5 for the collecting-register cells (51 to 511) is shown. The content of collecting register 5 is shifted by one collecting-register cell ($5i+1$) between each two transmissions and the signal image is added with the correct phase.

The amplitude $A_5$ in the i-th collecting-register cell $5i$ is in each case the i-multiple of the amplitude $A_3$ of the shift-register cell $3i$ of the shift register since, for the i-th collecting-register cell $5i$, i transmissions are added. The eleventh collecting-register cell 511 has therefore a content which corresponds to the eleventh multiple summation of signal 1 for the 11th, 22nd, 33rd, n-th cycle of the clock frequency $f_2$. The summation takes place once in each collecting-register cell $5i$. In this way, differences of individual shift-register cells and collecting-register cells ($3i$, $5i$) and transfer gates 4 of the CCD-array are effectively averaged.

The transmission to the evaluation circuit 6 is shown on the right side of FIG. 3. The content of the eleventh collecting-register cell 511 is read out with a further shift of the content of the collecting register 5.

The signal $S_6$ having the amplitude $A_6$ is shown as a function of time (t) in units of inverted clock frequency ($1/f_2$). The amplitude $A_6$ is the eleventh multiple of the amplitude $A_1$ of the signal 1. The pulse width is likewise the eleventh multiple and the signal frequency at the evaluation circuit is therefore one-eleventh of the frequency of the signal 1 at the input. Generally, the amplitude $A_6$ is increased by the factor of the specific number (z) and the frequency is reduced by the same factor (z).

In practice, the multiple (n) by which the clock frequency $f_2$ is greater than the first frequency $f_1$ with which the signal 1 is periodic, is greater by a multiple in the range of $10^2$ to $10^3$. Correspondingly, the amplification and frequency reduction is greater. The specific number (z) of the shift-register cells $3i$ and collecting-register cells $5i$ need not be greater by one than the multiple (n). This is however the most advantageous selection.

The CCD-array need not fix the specific number (z) of the shift-register cells $3i$ and collecting-register cells $5i$. This can take place with the circuitry and read-out logic, this way, the method is flexible for application and independent of specifically matched components.

For a very high clock frequency $f_2$, the shift register 3 can be realized by two CCD-array regions which alternately are driven at half clock frequency ($f_2/2$) and which both transmit to the same collecting register 5.

It is understood that the foregoing description is that of the preferred embodiments of the invention and that various changes and modifications may be made thereto without departing from the spirit and scope of the invention as defined in the appended claims.

What is claimed is:

1. A method for processing optical signals being periodical and having a first frequency, the method comprising the steps of:

converting the optical signals into electrical signals in a single photoelectric converter;

inputting the electrical signals into an analog shift register at a clock frequency which is an integer multiple of said first frequency greater than one;

after each lapse of a period of said first frequency, transmitting the content of said analog shift register in parallel to a collecting register;

repeating the above steps over a specific number of periods of said first frequency for accumulating a charge pattern in said collecting register;

after each lapse of said specific number of periods, emitting a sequential output to a downstream circuit; and, said optical signals being sinusoidal and said clock frequency of said analog shift register and said collecting register being three to eight times said first frequency.

2. The method of claim 1, wherein said optical signals comprise at least one pulse and the period of said clock frequency of said analog shift register and said collecting register is adapted to the pulse width of said pulse.

3. The method of claim 2, wherein an accumulation of an order of magnitude of $10^2$ to $10^3$ takes place in said collecting register.

4. The method of claim 1, wherein an accumulation of an order of magnitude of $10^2$ to $10^3$ takes place in said collecting register.

5. A method for processing optical signals being periodical and having a first frequency ($f_1$), the method comprising the steps of:

converting the optical signals into electrical signals;

inputting the electrical signals into an analog shift register at a clock frequency ($f_2$) which is an integer multiple (n) of said first frequency ($f^1$);

providing said analog shift register with a first number (z) of shift register cells (31, 32, . . . ; $3n+1$)

after the lapse of a number of the cycles of said clock frequency ($f^2$) equal to said first number (z), transmitting the content of said shift register in parallel to a collecting register having a number of collecting register cells (51, . . . $5n+1$) equal to said first number (z);

between each two transmissions, shifting the content of said collecting register into the collecting register cells (51, . . . $5n+1$) shifted by said second number (k); and, emitting the content of said second number (k) of the last collecting register cells (5n+1) to a downstream circuit.

6. The method of claim 5, wherein said second number (k) is equal to 1.

7. The method of claim 5, wherein the first number (z) is greater than the multiple (n).

8. The method of claim 5, wherein said optical signals are sinusoidal and said clock frequency ($f_2$) of said analog shift register and said collecting register is three to eight times said first frequency ($f_1$).

9. The method of claim 5, wherein said optical signals comprise at least one pulse and said period of said clock frequency ($f^2$, of said analog shift register and said collecting register is adapted to the pulse width.

10. The method of claim 5, wherein an accumulation of an order of magnitude of $10^2$ to $10^3$ takes place in said collecting register.

11. A circuit for processing optical signals being sinusoidal and having a first frequency, the circuit comprising:

a single photodiode converter for converting the optical signals into electrical signals;

an analog shift register connected to said photodiode for receiving said electrical signals at a clock frequency which is three to eight times said first frequency;

said analog shift register being configured as a charge-coupled arrangement;

a collecting register configured as a charge-coupled arrangement and to operate at a clock frequency which is three to eight times said first frequency; and, transmitting means for transmitting the content of said analog shift register in parallel to said collecting register after each lapse of a period of said first frequency.

12. The circuit of claim 11, said photodiode, said analog shift register and said collecting register being conjointly integrated on a chip.

13. A circuit for processing optical signals being periodical and having a first frequency ($f_1$), the circuit comprising:

a photodiode for converting the optical signals into electrical signals;

an analog shift register connected to said photodiode for receiving said electrical signals at a clock frequency ($f_2$) which is an integer multiple (n) of said first frequency ($f_1$)

said analog shift register being configured as a charge-coupled arrangement;

said analog shift register having a first number (z) of shift register cells (31, 32, . . . ; 3n+1) which is different by a second number (k) from said integer multiple (n);

a collecting register having said first number (z) of collecting register cells (51, . . . 5n+1) and being configured as a charge-coupled arrangement;

transmitting means for transmitting the content of said analog shift register in parallel to said collecting register after each lapse of a number of the cycles of said clock frequency ($f_2$) equal to said first number (z); and, means for shifting the content of said collecting register into the collecting register cells (51, . . . 5n+1) shifted by said second number (k).

14. The circuit of claim 13, said analog shift register and said collecting register conjointly being integrated on a chip.

\* \* \* \* \*

UNITED STATES PATENT AND TRADEMARK OFFICE
CERTIFICATE OF CORRECTION

PATENT NO. : 5,486,858

DATED : January 23, 1996

INVENTOR(S) : Klaus Knupfer

It is certified that error appears in the above-identified patent and that said Letters Patent is hereby corrected as shown below:

In column 3, line 62: delete "31 to 3n)." and substitute -- (31 to 3n). -- therefor.

In column 4, line 34: delete "sequentially," and substitute -- sequentially -- therefor.

In column 5, line 56: delete "logic," and substitute -- logic. In -- therefor.

In column 6, line 39: delete "($f^1$);" and substitute -- ($f_1$); -- therefor.

In column 6, line 41: after "3n+1)" insert the following: -- which is different by a second number (k) from said integer multiple (n); --.

In column 6, line 43: delete "($f^2$)" and substitute -- ($f_2$) -- therefor.

In column 6, line 63: delete "($f^2$," and substitute -- ($f_2$) -- therefor."

UNITED STATES PATENT AND TRADEMARK OFFICE
CERTIFICATE OF CORRECTION

PATENT NO. : 5,486,858

DATED : January 23, 1996

INVENTOR(S) : Klaus Knupfer

It is certified that error appears in the above-identified patent and that said Letters Patent is hereby corrected as shown below:

In column 8, line 4: delete "$(f_1)$" and substitute -- $(f_1)$; -- therefor.

Signed and Sealed this

Fourth Day of June, 1996

Attest:

BRUCE LEHMAN

Attesting Officer

Commissioner of Patents and Trademarks